United States Patent [19]

Ishinabe et al.

[11] Patent Number: 5,373,316
[45] Date of Patent: Dec. 13, 1994

[54] VIDEO CONFERENCE DEVICE WITH FACSIMILE FUNCTION

[75] Inventors: Iwao Ishinabe, Yokohama; Nobuyuki Matsuyama, Fujisawa; Nobuyoshi Torii; Shuichi Ishiwata, both of Yokohama; toshiaki Watanuki, Fujisawa; Tomoki Kozono, Yokohama; Toshiyuki Sumida, Toyohashi; Yoji Shibata, Yokosuka; Kiyoshi Ishida, Yokohama, all of Japan

[73] Assignee: Hitachi, Ltd., Tokyo, Japan

[21] Appl. No.: 26,812

[22] Filed: Mar. 5, 1993

[30] Foreign Application Priority Data

Mar. 30, 1992 [JP] Japan .................. 4-073752

[51] Int. Cl.$^5$ .................. H04M 11/00; H04N 7/12
[52] U.S. Cl. .................. 348/15; 379/96; 379/100
[58] Field of Search .................. 379/53, 54, 93, 96–98, 379/100, 202, 201, 204, 205, 206; 348/14–16

[56] References Cited

U.S. PATENT DOCUMENTS

| | | | |
|---|---|---|---|
| 4,823,375 | 4/1989 | Yoshida | 379/100 |
| 4,878,242 | 10/1989 | Springer et al. | 379/54 |
| 4,939,772 | 7/1990 | Goto | 379/100 |
| 5,136,581 | 8/1992 | Muehrcke | 379/54 |

FOREIGN PATENT DOCUMENTS

| | | |
|---|---|---|
| 0091327A1 | 10/1983 | European Pat. Off. . |
| 0094096B1 | 11/1983 | European Pat. Off. . |
| 63-31385 | 2/1988 | Japan . |
| 63-203079 | 8/1988 | Japan . |
| 2-22989 | 1/1990 | Japan . |
| 2-39790 | 2/1990 | Japan . |
| 2039693 | 2/1990 | Japan . |
| 2-180485 | 7/1990 | Japan . |
| 2301252 | 12/1990 | Japan . |

Primary Examiner—Wing F. Chan
Attorney, Agent, or Firm—Antonelli, Terry, Stout & Kraus

[57] ABSTRACT

A videoconference device connected to a general commercially available facsimile unit and having a function of sending/receiving a facsimile signal during communication. The videoconference device 1 has a facsimile connection terminal connected to a facsimile unit line connection terminal; a call unit for outputting a call signal for a general analog telephone; a 2W/4W convertor for converting a signal from a 2-line facsimile unit to a signal in a 4-line system where the sending and receiving of signals are separated; a voice band signal encode/decode unit for encoding/decoding a facsimile voice band signal; a power supply for supplying to the facsimile connection terminal a voltage/current which meets the standards of a general analog telephone set; a first current detector for detecting the flow of a current on the basis of supply power from the power supply; a first switching unit for selecting whether a signal from the facsimile connection terminal should be connected to the call unit or to a circuit composed of the power supply, 2W/4W converter, and first current detector; a videoconference control unit: and a multiplexing-/demultiplexing control unit for multiplexing the encoded/decoded facsimile voice band signal with a video/voice signal and for demultiplexing the multiplexed signal into facsimile voice band signal, a video/voice signal.

42 Claims, 8 Drawing Sheets

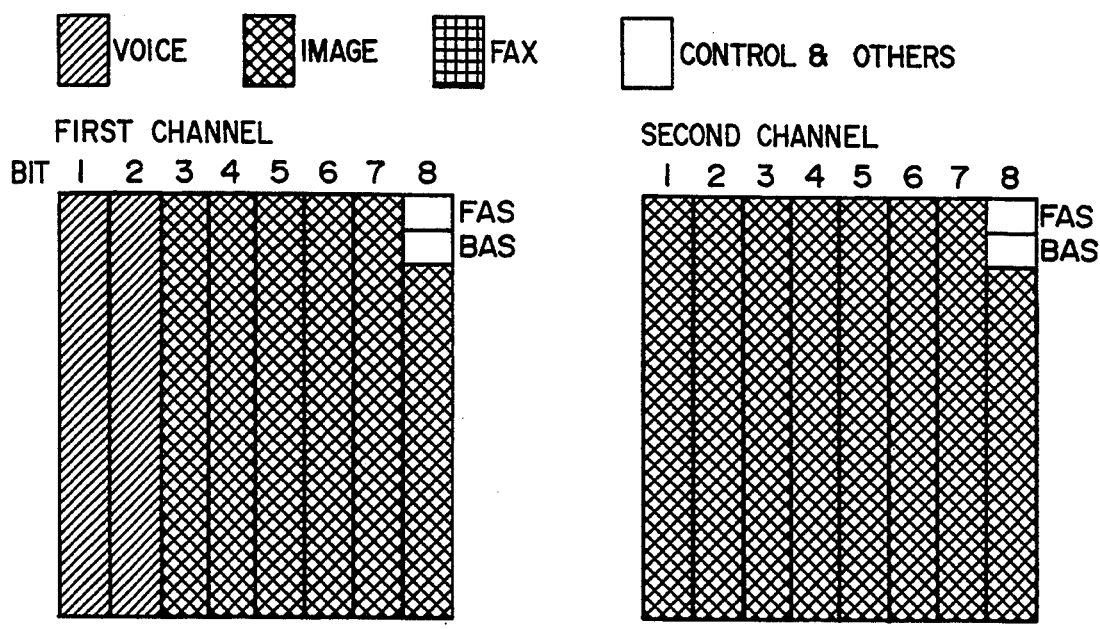

VIDEO CONFERENCE DEVICE WITH FACSIMILE FUNCTION

CROSS-REFERENCE TO RELATED APPLICATION

This application relates to U.S. patent application Ser. No. 07/913,489 filed on Jul. 15, 1992 and U.S. patent application Ser. No. 07/913,402 filed on Jul. 15, 1992, and assigned to the present assignee. The contents of those applications are incorporated herein by reference.

BACKGROUND OF THE INVENTION

The present invention relates to videoconference devices used in videophones/videoconferences which communicate using voice/image signals.

Conventionally, when a facsimile unit (FAX)is used for a videoconference, a special facsimile unit having a data communication interface for connection of the facsimile unit is used to send/receive an encoded facsimile signal multiplexed with other image/voice data to/from a videoconference device through data communication using an interface such as a RS-232C.

Techniques associated with those techniques are described in JP-A-2-39790 and JP-A-2-22989.

In the realization of the facsimile transmission/reception to/from the other party in a videophone/videoconference using a facsimile device connected to a videoconference device, the facsimile device must be able to connect to a general commercially available telephone network and not a special facsimile unit having a dedicated interface such as that in the conventional device.

The facsimile unit used is also required to be compatible with a facsimile unit with an internal telephone function comprising a dialing function as well as a more inexpensive dialing function-free facsimile unit with an external telephone.

It is therefore an object of the present invention to provide a videoconference device which is capable of facsimile communication using a general commercially available facsimile unit during communication of a videoconference.

SUMMARY OF THE INVENTION

In the present invention, in order to connect a general commercially available facsimile unit to a videoconferance device, the videoconferance device comprises a facsimile connection terminal, call means, 2 wire to 4 wire (2W/4W) converting means, voice band signal encode/decode means, power supply means, first current detecting means, first switching means, and facsimile control means.

The videoconferance device comprises a telephone connection terminal which is connected to a telephone connection terminal of the facsimile unit, second switching means, and second current detecting means so as to permit the use of a facsimile unit with a dialing function-free external telephone set.

The supply means supplies a voltage/current which meets the standards of general analog telephones and simulates a state in which the facsimile unit is connected to a general telephone line.

The first current detecting means detects the flow of a current and hence whether the facsimile unit is in communication. The calling means generates a calling pulse equivalent to that generated in a general analog telephone line to thereby call a target facsimile unit.

When a target facsimile unit is called, the first switching means switches the facsimile signal from the power supply to the calling means.

The second switching means short-circuits the facsimile telephone connection terminal to simulate an external telephone.

BRIEF DESCRIPTION OF THE DRAWINGS

FIG. 4 shows a transmission frame structure in the embodiment of the present invention.

FIG. 5 shows a transmission frame structure used when a videoconference device of the embodiment of the present invention uses two 64-kbps channels in an INS-64 service to send/receive voice data and image data.

DESCRIPTION OF THE PREFERRED EMBODIMENTS

Embodiments of the present inventions will be described below with respect to FIGS. 1-10.

Figure 1:
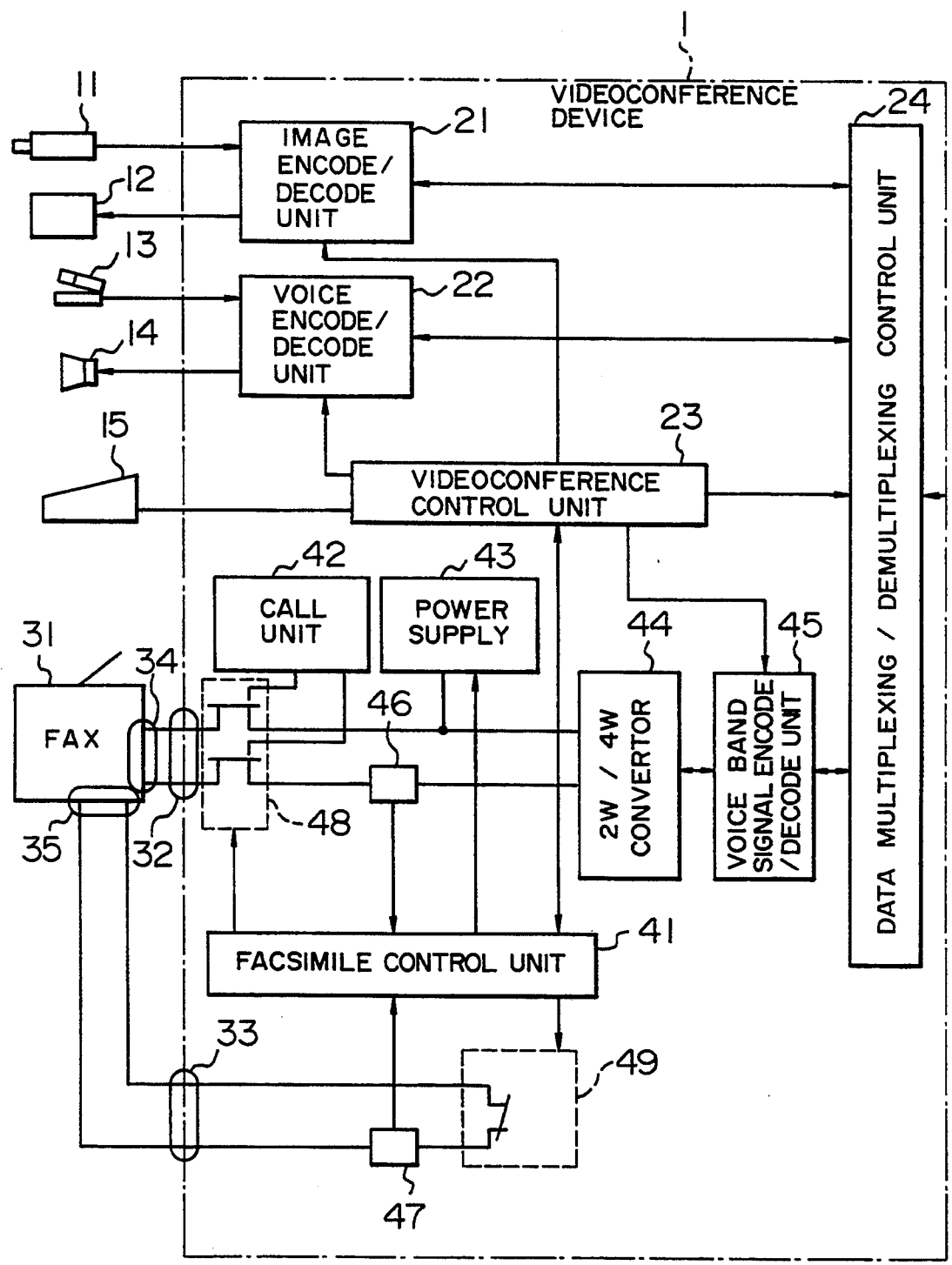
FIG. 1 shows the functional structure of one embodiment of the present invention.

FIG. 1 shows an overall structure of a videoconference device of one embodiment of the present invention.

In FIG. 1, reference numeral 1 denotes a videoconferance device; 11, a camera; 12, a display; 13, a voice input unit; 14, a voice output unit; 15, a key input unit; 21, an image encode/decode unit; 22, a voice encode/decode unit; 23, a videoconference control unit; 24, a data multiplexing/demultiplexing control unit which multiplexes image data, voice data, and other data and sends the multiplexed data to a communication network and demultiplexing multiplexed data from the communication network into image data, voice data and other data; 31, a general facsimile unit; 32, a facsimile connection terminal; 33, a telephone connection terminal; 34, a line connection terminal of the facsimile unit 31; 35, a telephone connection terminal of the facsimile unit 31; 41, a facsimile control unit which controls the respective functional units for connection of the facsimile unit; 42, a call unit; 43, a power supply for the facsimile unit; 44, a 2W/4W converter which converts a signal from a 2-wire facsimile unit to a signal in a 4-wire system where the sensing and receiving of signals are separated; 45, a voice band signal encode/decode unit which encodes/decodes a voice band signal from the facsimile unit; 46, a first current detector; 47, a second current detector; 48, a first switching unit which selects whether a signal from the facsimile connection terminal 32 should be connected to the call unit 42 or to a circuit composed of the power supply 43, the 2W/4W converter 44, and the first current detector 46; and 49, a second switching unit which selects whether the two lines from the telephone connection terminal 33 should be short-circuited or opened. Since the basic structures of those elements are disclosed in the related patents shown as cross-references, a further detailed description of these elements will be omitted and only essential portion of the present invention will be described below.

The operation and facsimile send/receive operation of the videoconference device of the present embodiment will be described below.

An image signal from the camera 11 is encoded by the image encode/decode unit 21 and output to the data multiplexing/demultiplexing control unit 24. An encoded image signal from the control unit 24 is decoded by the image encode/decode unit 21 and displayed on the display 12. Similarly, a voice signal from the voice input unit 13 is encoded by the voice encode/decode unit 22 and output to the data multiplexing/demultiplexing unit 24. An encoded voice signal from the control unit 24 is encoded by the voice encode/decode unit 22 and output through the voice output 14. Keyed-in data from the key input unit 15 is sent to the videoconference control unit 23 which combines the keyed-in data with what the appropriate key means to control the overall videoconference unit by requesting a line from the communication network, responding to a request for receipt of an incoming call from the network, and setting a mode in each of sections constituting the videoconference device.

The respective operations of the elements of the videoconference device connected to a facsimile unit to send/receive a facsimile communication during videoconference will be described below.

The facsimile unit 31 is a general one the line and telephone connection terminals 34 and 35 of which are connected to the facsimile and telephone connection terminals 32 and 33, respectively, of the videoconference device 1.

Figure 2:
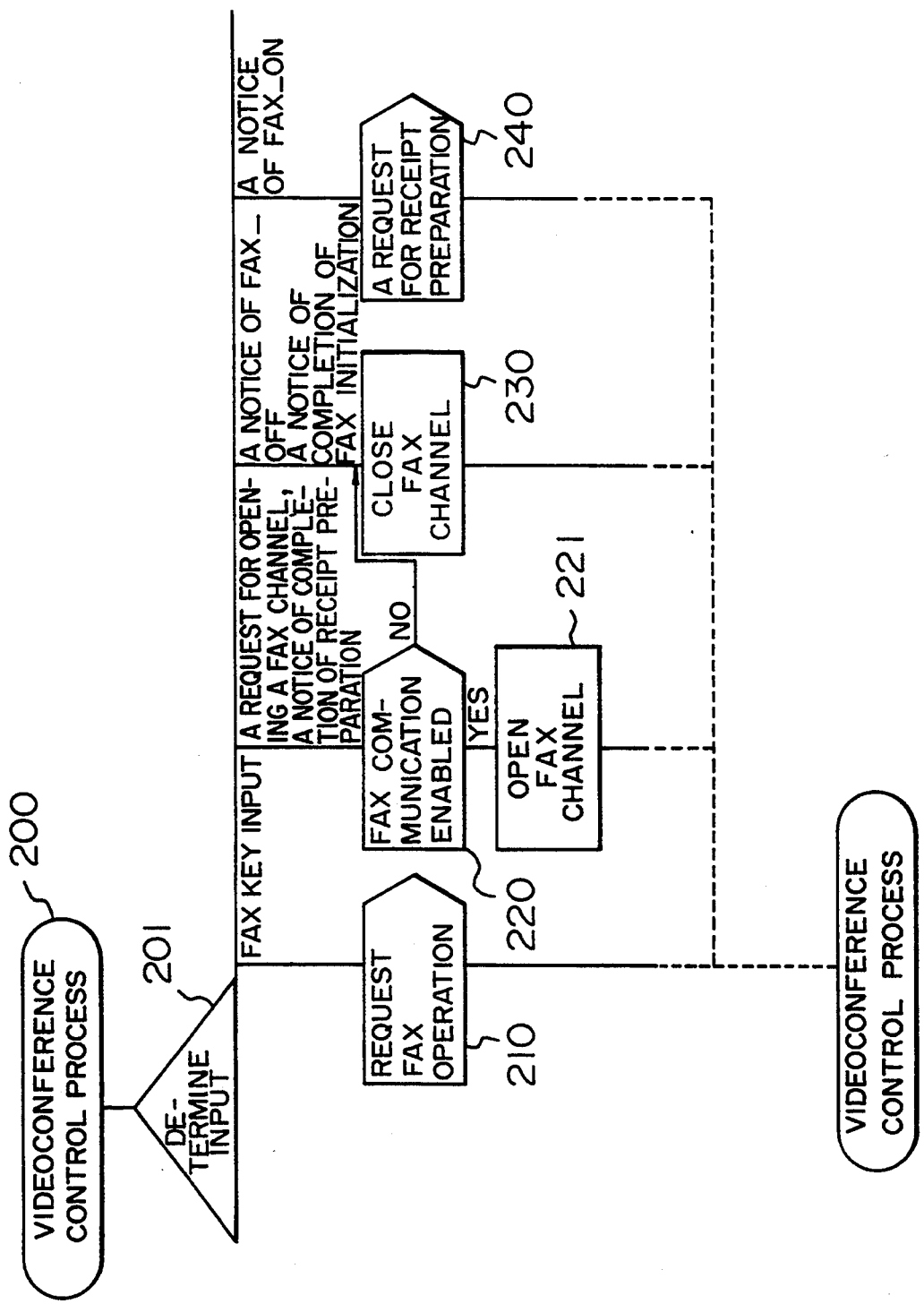
FIG. 2 illustrates facsimile unit-related steps of a videoconference control process in the embodiment of the invention.
Figure 3:
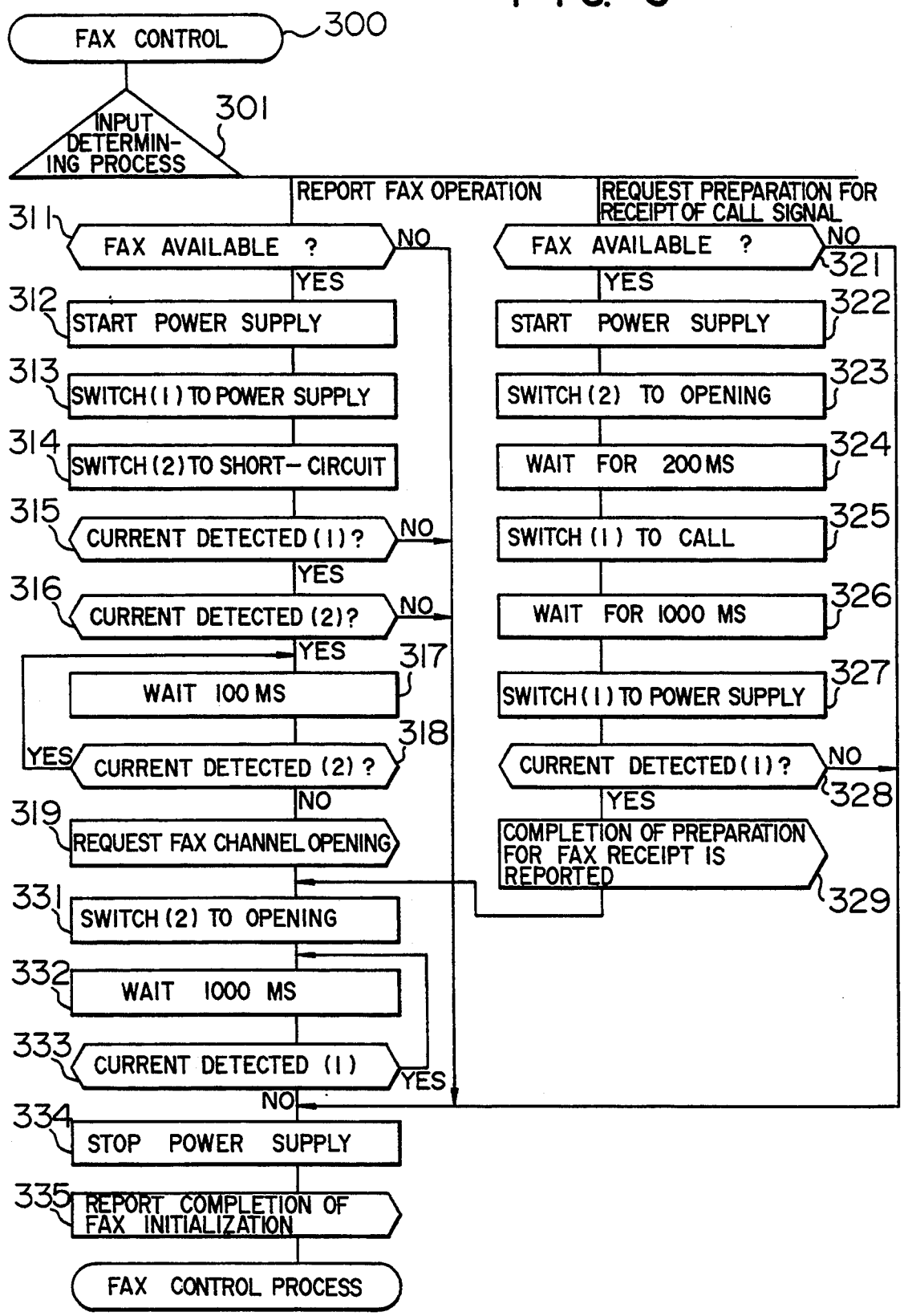
FIG. 3 illustrates facsimile control steps provided in the embodiment of the present invention.

Control over the transmission/reception of the facsimile unit is realized by the videoconference control unit 23 and a facsimile control unit 41. FIG. 2 shows the facsimile control steps of the videoconference control process by the videoconference control unit 23. FIG. 3 shows the basic facsimile control process by the facsimile control unit 41. Facsimile transmission is started by the depression of a particular key (hereinafter referred to as a FAX key) of the key input unit 15 to signal the videoconference device 1 during communication. When the FAX key is depressed, the key input is determined at step 201 of a videoconference process 200 in the videoconference control unit 23 and a request for operating the facsimile unit is sent to a facsimile control process of the facsimile control unit 41 (step 210). In the facsimile control process 300 in the facsimile control unit 41 and having received the operating request, input determination is made (step 301). At step 311 the operating state of the overall videoconference device is determined as to whether a facsimile communication is available. If so, power supply is started to the facsimile unit (step 312) and the first switching unit 48 is switched to the power supply 43 (step 313), and the second switching unit 49 is switched to the short-circuiting side (step 314). At steps 315 and 316 it is determined whether a current loop is formed. At steps 317 and 318 control waits for 100 ms and detects whether the second current detector 47 is put in a non-detection state. If so, it is determined that the facsimile unit 31 is placed in a transmission state. Thus at step 319 a request or opening a facsimile channel is made to the videoconference control process 200 in the videoconference control unit 41. The videoconference control process 200 determines which kind the input is (step 201). A facsimile communication enable state is ascertained at step 220. Then at step 221 control for opening the facsimile channel is provided by the data multiplexing/demultiplexing control unit 24. By the above processing, a process for transmission from the facsimile unit is realized. The detection of the termination of the transmission by the facsimile unit 31 is ascertained by the fact that the first current detector 46 is placed in a current non-detection state at steps 332 and 333 after the second switching unit 49 is placed in an open state at step 331. The detection of the end of the transmission by the facsimile unit 31 stops power supply to the facsimile unit 31 at step 334 and the completion of initialization of the facsimile unit is reported to the videoconference control process 200 at step 335. This reporting is determined as a proper input at step 201 of the videoconference control process 200 and the facsimile channel is closed at step 250. When the reception facsimile channel of the other party is closed, the data multiplexing control unit 24 of the other party detects that fact by inband signalling (a BAS unit in the transmission frame to be described later in more detail) in a first channel to send a notice of FAX_ OFF to the videoconference control process 200. This notice is determined as a proper input at step 230 of the videoconference control process 200 and the facsimile channel is closed at step 230. By the above processing, the termination of transmission by the facsimile unit 31 is realized.

The operation of the videoconference device performed when there is an incoming facsimile signal will be described below. When the data multiplexing-/demultiplexing control unit 24 ascertains the opening of the facsimile channel of the other party, it sends a notice of FAX_ON to the videoconference control unit 23. In the step 201 of the videoconference control process 200, the input is determined as a proper one and a request for preparing for receipt of the incoming signal is made at step 240 to the facsimile control process 300. At step 301 of the facsimile control process 300, the input is determined as a proper one, the facsimile communication enable state is ascertained at step 321, power supply is started at step 322 and the second switching unit 49 is set to the open side at step 323. Control waits for 2000 ms at step 324 and the first switching unit 48 is set to the calling unit 42 side at step 325. In addition, control waits for 1000 ms at step 326 and sets the first switching unit 48 to the power supply 43 side at step 327. It is then checked at step 328 whether the first current detector 46 is in the current detection state. When the first current detector 46 is in the current non-detection state, control returns to step 324, where the subsequent steps are repeated. At step 329 a notice of completion of facsimile receipt preparation is sent to the videoconference control process 200. After the input determination at step 201 of the videoconference control process 200, and the ascertainment of the facsimile communication enable state at step 220, the notice of completion of the facsimile receipt preparation causes the data multiplexing/demultiplexing control unit 24 to provide control for opening the facsimile channel (step 221). By the those processes, the process for receipt by the facsimile unit 31 is realized.

FIG. 4 shows the structure of a transmission frame which the videoconference device 1 of the embodiment of the present invention uses for multiplexing data. One transmission frame is composed of 640 bits or 80 octets each octet composed of 8 bits in a data channel of 64 kbps. A collection of the first bits of the octets is called a first subchannel; similarly, the collections of the second to eight bits of the octets constitute the corresponding second to eighth subchannels, each subchannel being an 8-kbps data channel. Thus, 8 subchannels in all are provided. The basic data multiplexing is performed by allocation of such subchannels. Thus, a 16-kbps data channel is realized by the use of two such successive 8 kbps subchannels. This transmission frame is ascertained and constituted by a 8-bit frame synchronization fixed pattern (hereinafter referred to as a FAS signal) which occupies the first-eighth octets in the eighth subchannel. The 9th-16th octets of the 8th subchannel are used for transmission of a command to designate the disposition of multiplexed data and data on display of other data (hereinafter referred to as a BAS signal). The 6.4-kbps data channel of the 17th and subsequent octets is used as a data multiplexing channel like other subchannels. In FIG. 4, the FAS and BAS imply Frame Alignment Signal and Bit-rate Allocation Signal, respectively.

The relationship between the opening/closing operations of the facsimile channel and the structure of the transmission frame will be described next. FIG. 5 shows the structure of a transmission frame employed when the videoconference device according to the embodiment of the present invention uses two 64-kbps channels in an INS-64 service. The FAX channel is now closed. The frame timings for two transmission channels each composed of two 64-kbps data channels are compared on the receipt side and appropriate delay devices are inserted into the corresponding data channels to correct the difference between their transmission times. FIG. 5 shows multiplexing of voice data and image data during communication of the videoconference device and occupying 16 and 107.2 kbps, respectively, of the total transfer rate of 128 kbps. The control and other data have 3.2 kbps.

Figure 6:
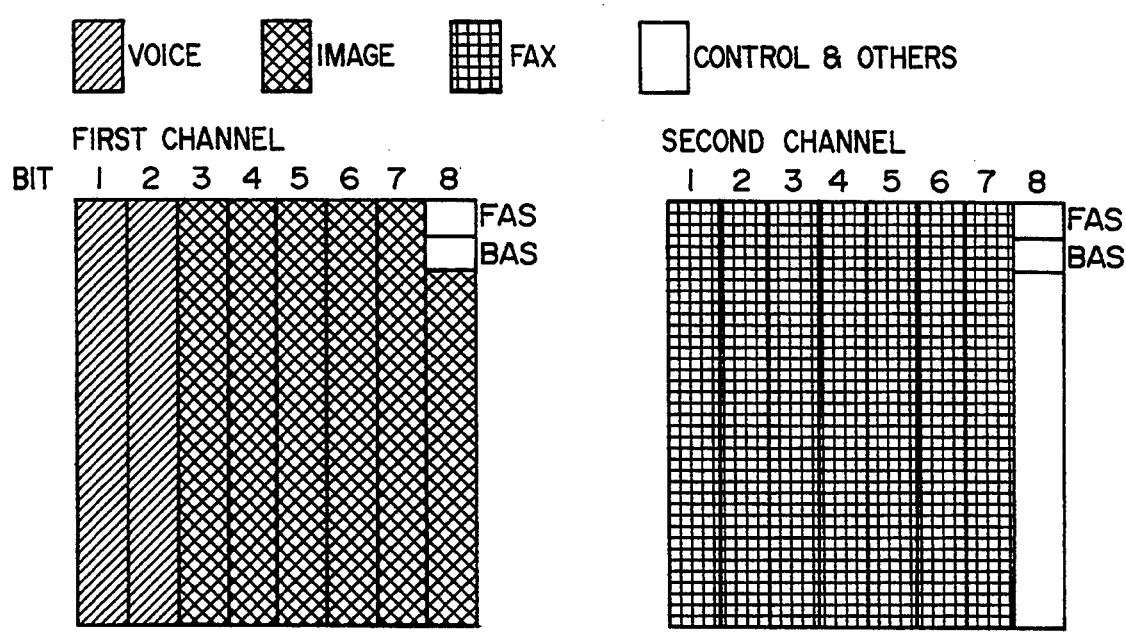
FIG. 6 shows a transmission frame structure used when a videoconference device of the embodiment of the present invention uses two 64-kbps channels in an INS(Information Network System)-64 service to send/receive voice data, image data and data on encoded facsimile voice band signal.

When the FAX channel is opened, the transmission frame structure changes as follows: FIG. 6 shows a transmission format where encoded data on a facsimile voice band signal is multiplexed in the videoconference device as the embodiment of the present invention. In FIG. 5, the encoded facsimile voice band data occupies as a 56-kbps data channel the first-seventh subchannels of the second channel occupied by the image. The non-image data occupies as data channel of 46.4 kbps the third-eighth subchannels of the first channel. The voice data is 16 kpbs while control and other data is 9.6 kbps.

The transmission formats of FIGS. 5 and 6 can be identified and constructed by a combination of BAS signals whose sense can be beforehand determined and identified at both the terminals, and transmitted in a plurality of frames.

Figure 7:
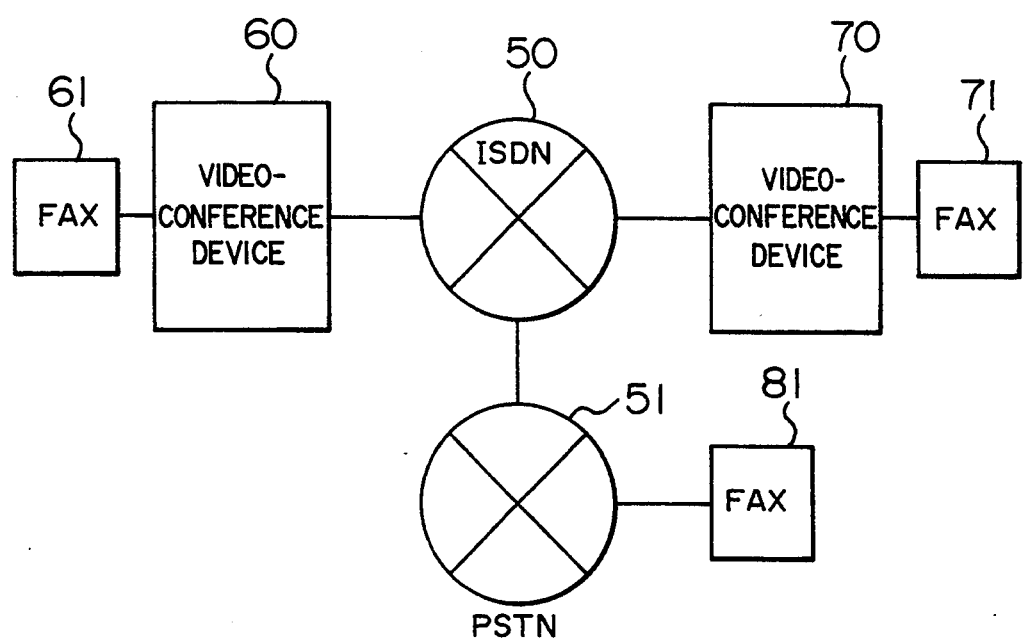
FIG. 7 shows the connection of the embodiment of the present invention and a communication network.

FIG. 7 shows the connection of the embodiment of the present invention and an ISDN (Integrated Services Digital Network). Reference numerals 61, 71 and 81 each denote a facsimile unit; 60, 70 each, videoconference device; and 50, an ISDN; and 51, a PSTN (Public Switched Telephone Network). The above description is directed to facsimile data transmission/receipt using facsimile units 61 and 71 in the videoconference. Since the ISDN 50 is connectable to the telephone network 51, the facsimile unit 61 could send/receive data through the ISDN 50 to/from the facsimile unit 81 connected to the telephone network.

In this case, when the other part terminal can be determined by the user or data from the communication network to be a facsimile unit connected to the telephone network, the videoconference control unit 23 controls the facsimile voice band encode/decode unit 45 such that the voice band encode/decode unit 45 is directly connected to the 64-kbps data channel of the communication network without using the transmission frame structure of FIG. 4 so as to cause the encode/decode unit 45 to operate in an encoding system used by the communication network.

Figure 8:
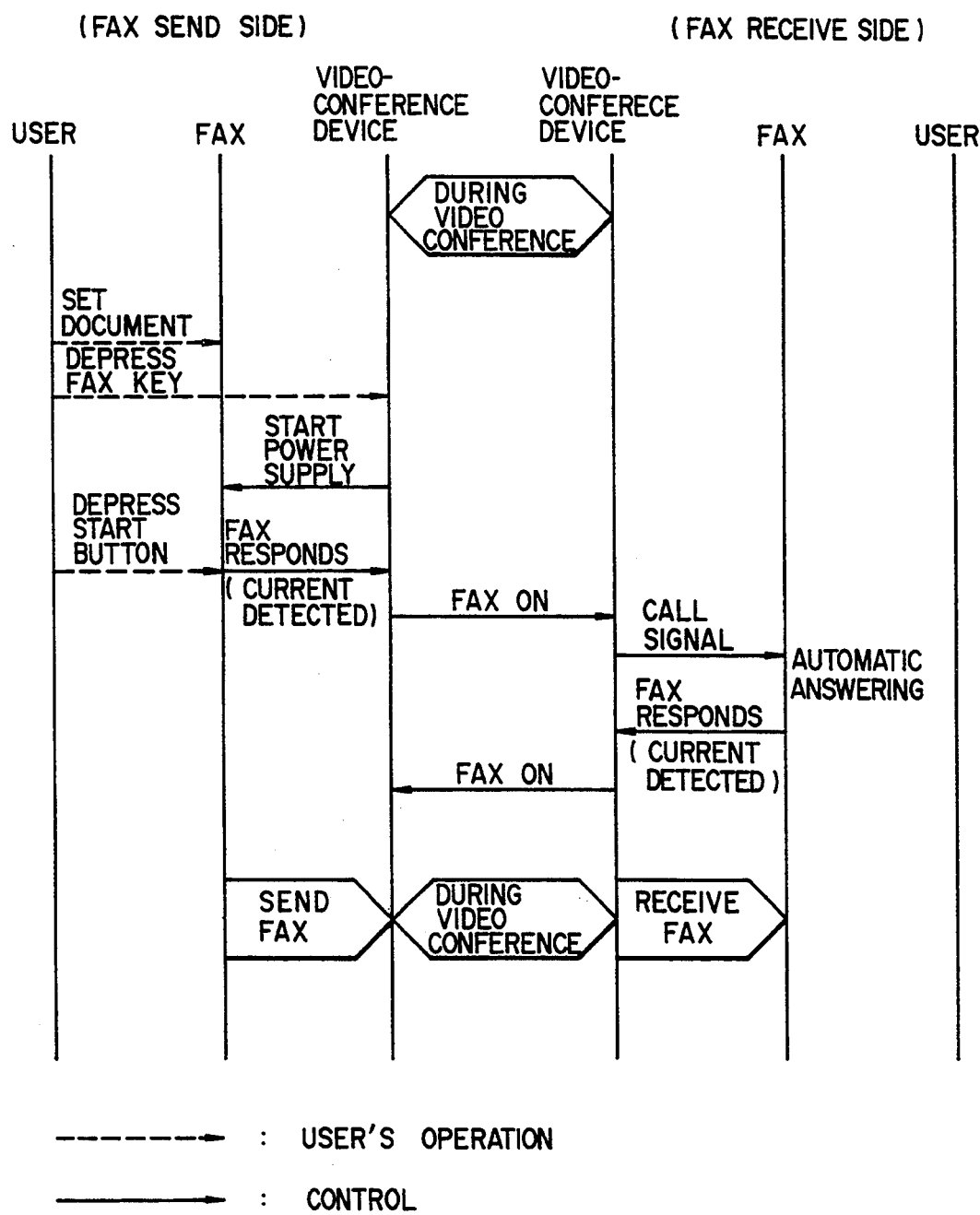
FIG. 8 shows a control sequence provided in the FIGS. 1-6 embodiment of the present invention.

FIG. 8 shows a control sequence in the embodiment of FIGS. 1-6. The user's depression of the FAX key in the key input unit 15 starts to supply power to the facsimile unit. The user's depression of the send key (start button) of the facsimile unit starts to send/receive facsimile data.

Beforehand supply of power to the facsimile unit and depression of the send key of the facsimile unit by a single touch operation is realized, for example, when the power supply is turned on or when a call is established in the communication network without using the FAX key operation as a timing for power supply.

Figure 9:
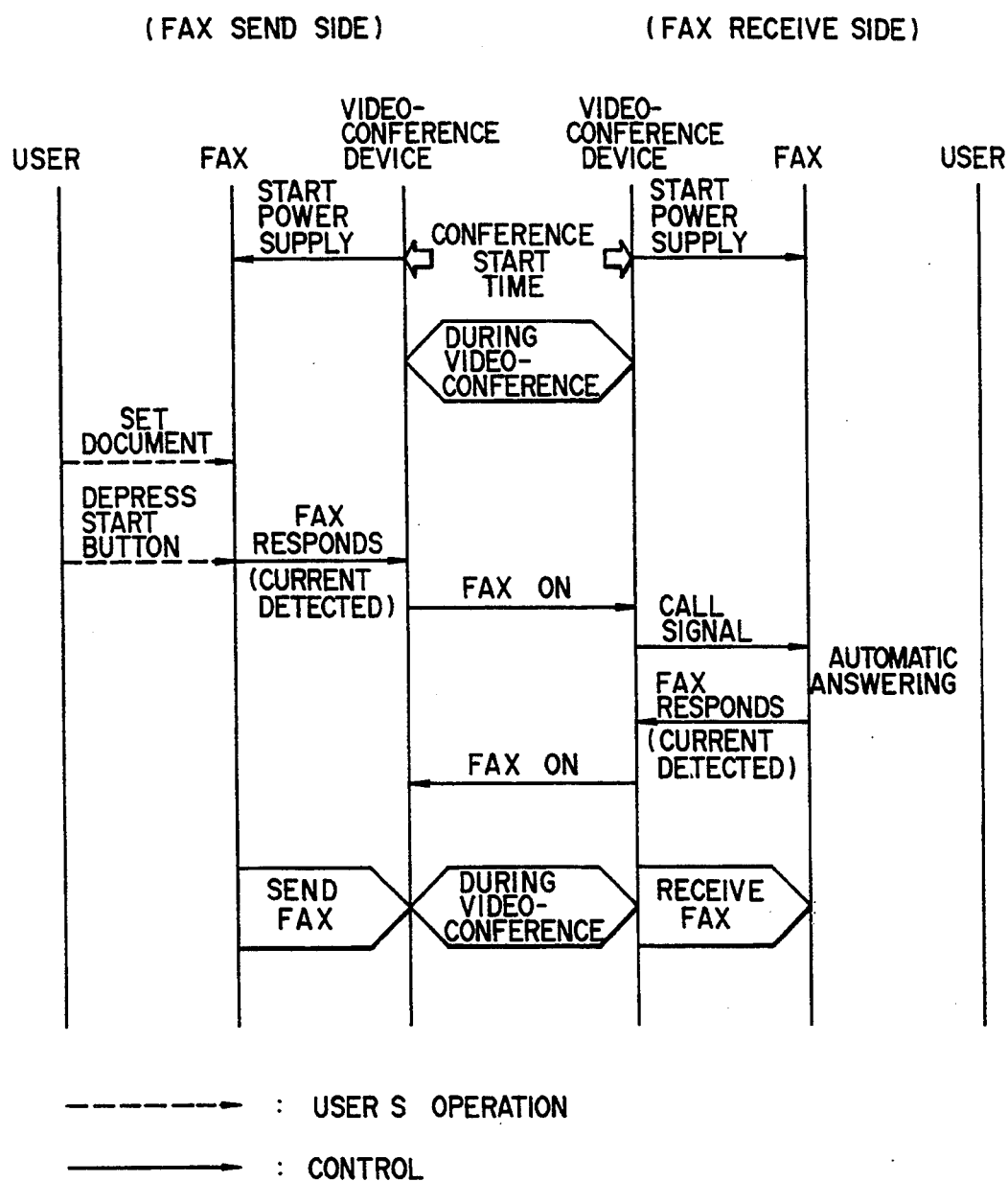
FIG. 9 shows a control sequence provided in another embodiment of the present invention.

The control sequence performed at this time is shown in FIG. 9. In this case, steps corresponding to the steps 311-316 of FIG. 3 are performed earlier than the performance of steps 311-316. When the second current detector 47 is placed in the non-detection state, the facsimile transmission is performed. If a request for preparation for receipt of an incoming signal is received, the processing structure is modified so as to perform facsimile reception.

Figure 10:
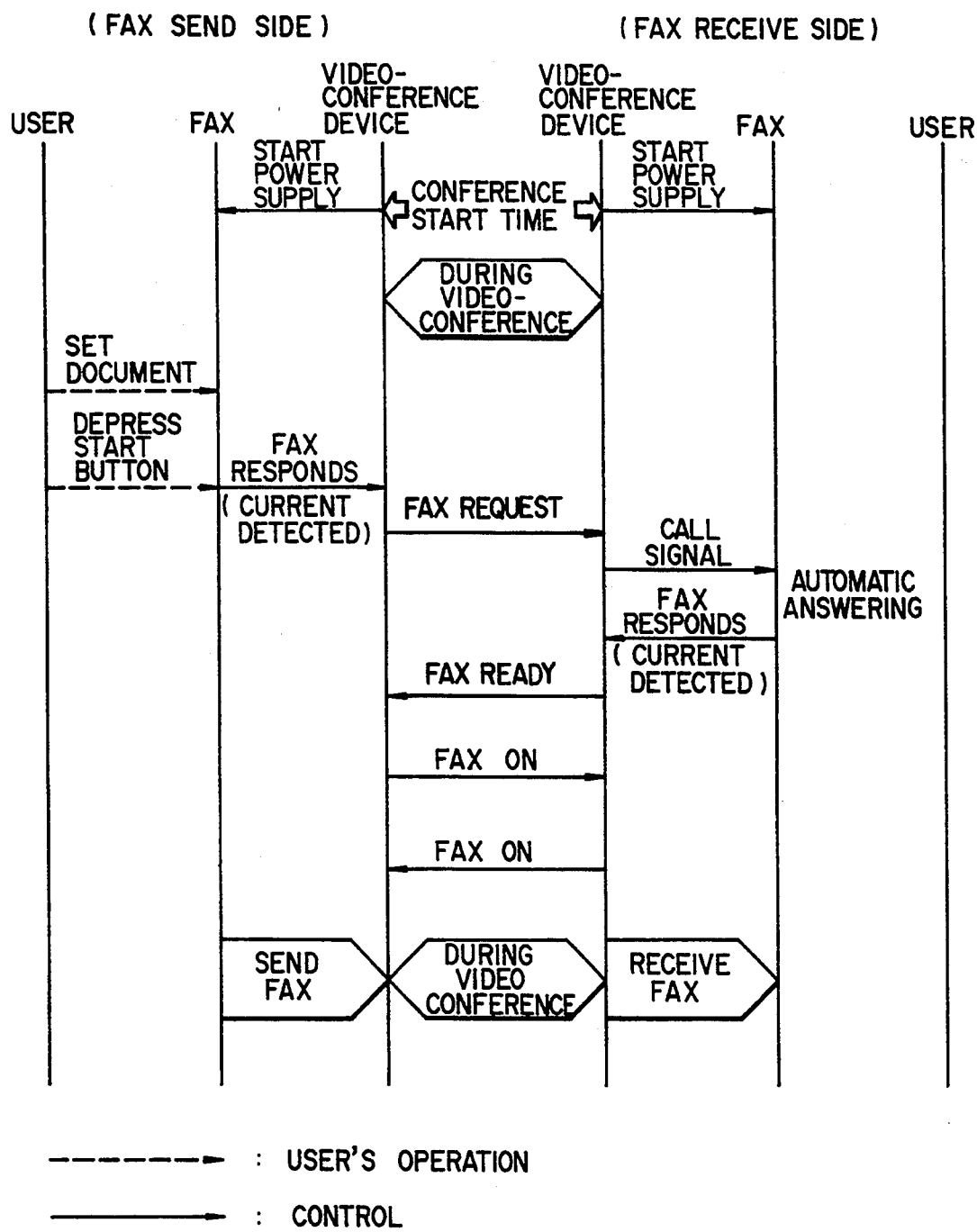
FIG. 10 shows a control sequence provided in a further embodiment of the present invention.

When it is unclear whether the videoconference device of the other party is provided with a facsimile unit, the videoconference device of this side can inquire of that of the other party whether the other party has an available facsimile unit before a channel for an encoded facsimile signal is established. The control sequence performed in this case is shown in FIG. 10. This is easily realized by defining beforehand a code indicative of facsimile request command and a code indicative of facsimile ready command in the BAS signal in the transmission frame.

When facsimile data for the videoconference device is received, its call unit 42 may output a 16-Hz call signal to use the automatic answering function.

The call unit 42 may output a 1,300 Hz call signal, so that the use of the automatic answering function (non-ring calling function) is easily realized. The signals of 16 and 1300 Hz are ones commonly used in telephone-network.

In order to connect the videoconference device to a communication network, "A calling method for communication terminal device" being filed to U.S. Patent Office based on JP-A-4-126447 may be used.

According to the present invention, facsimile transmission/reception is achieved by a general commercially available facsimile unit during communication of a moving color image videoconference device. An efficient videoconference system is constructed at reduced cost compared to the conventional system.

What is claimed is:

1. A videoconference device comprising:
   video input means for receiving an image to generate an image signal;
   image encode/decode means for encoding/decoding the image signal;
   means for outputting a received decoded image signal;
   voice input means for receiving voice to generate a voice signal;
   voice encode/decode means for encoding/decoding the voice signal;
   means for outputting a received decoded voice signal;
   a telephone network simulator for interfacing a facsimile unit;
   signal converting means for converting a signal from a facsimile unit to a digital signal and converting a digital signal to a signal for the facsimile unit;
   facsimile control means for controlling said telephone network simulator;
   multiplexing/demultiplexing communication control means for multiplexing voice, image and facsimile communication data and sending the multiplexed data to a communication network and demultiplexing multiplexed data from the communication network into respective voice, image and facsimile communication data;
   control data inputting means for inputting data on dial or other function selection; and
   videoconference control means connected to said control data inputting means for controlling said image encode/decode means, voice encode/decode means, signal converting means, facsimile control means, and multiplexing/demultiplexing communication control means,
   wherein said facsimile control means detects an operative state of a facsimile unit on the basis of a control request from said videoconference control means and a signal from said telephone network simulator, controls said telephone network simulator and requests said videoconference control means to send/receive data on the facsimile unit;
   wherein said telephone network simulator is controlled by said facsimile control means and simulates an external telephone set for the facsimile unit;
   wherein said telephone network simulator comprises:
   a telephone connection terminal for connecting to a telephone connection terminal of a facsimile unit,
   second switching means for selecting whether two lines from said telephone connection terminal should be short-circuited or opened, and
   second current detecting means for detecting the flow of a current on the basis of short-circuiting of the two lines from said telephone connection terminal,
   whereby said facsimile control means controls said second switching means and said second current detecting means detects the operative state of the facsimile unit.

2. A videoconference device comprising:
   video input means for receiving an image to generate an image signal;
   image encode/decode means for encoding/decoding the image signal;
   means for outputting a received decoded image signal;
   voice input means for receiving voice to generate a voice signal;
   voice encode/decode means for encoding/decoding the voice signal;
   means for outputting a received decoded voice signal;
   a telephone network simulator for interfacing a facsimile unit;
   signal converting means for converting a signal from a facsimile unit to a digital signal and converting a digital signal to a signal for the facsimile unit;
   facsimile control means for controlling said telephone network simulator;
   multiplexing/demultiplexing communication control means for multiplexing voice, image and facsimile communication data into a single multiplexed signal including said voice, image and facsimile communication data and sending the multiplexed data signal to a communication network and demultiplexing a multiplexed data signal including voice, image and facsimile communication data from the communication network into respective voice, image and facsimile communication data;
   control data inputting means for inputting data on dial or other function selection; and
   videoconference control means connected to said control data inputting means for controlling said image encode/decode means, voice encode/decode means, signal converting means, facsimile control means, and multiplexing/demultiplexing communication control means,
   wherein said facsimile control means detects an operative state of a facsimile unit on the basis of a control request from said videoconference control means and a signal from said telephone network simulator, controls said telephone network simulator and requests said videoconference control means to send/receive data on the facsimile unit.

3. A videoconference device according to claim 2, wherein said signal converting means comprises:
   two wire to four wire (2W/4W) converting means for converting a signal from a 2-line facsimile unit to a signal in a 4-line system where the sending and receiving of signals are separated; and
   voice band signal encode/decode means for encoding/decoding a voice band signal from said 2W/4W converting means.

4. A videoconference device according to claim 2, wherein said telephone network simulator is controlled by said facsimile control means and simulates an external telephone set for the facsimile unit.

5. A videoconference device according to claim 4, comprising means for communicating with the facsimile unit connected to the telephone network.

6. A videoconference device according to claim 5, comprising:
   means for supplying power beforehand to the facsimile unit and for performing facsimile transmission by a single touch including only the depression of a facsimile sending key.

7. A videoconference device according to claim 6, comprising:
   means for outputting a 16 Hz call signal to the facsimile unit to inform the facsimile to be called and causing the facsimile unit to automatically answer the call signal using an automatically answering function of the facsimile unit.

8. A videoconference device according to claim 7, comprising:
   means for outputting a 1300 Hz single tone signal to the facsimile unit to inform the facsimile to be called and causing the facsimile unit to automatically answer the signal using an automatically answering function (non-ring calling function) of the facsimile unit.

9. A videoconference device according to claim 5, comprising:
means for outputting a 16 Hz call signal to the facsimile unit to inform the facsimile to be called and causing the facsimile unit to automatically answer the call signal using an automatically answering function of the facsimile unit.

10. A videoconference device according to claim 9, comprising:
means for outputting a 1300 Hz single tone signal to the facsimile unit to inform the facsimile to be called and causing the facsimile unit to automatically answer the signal using an automatically answering function (non-ring calling function) of the facsimile unit.

11. A videoconference device according to claim 4, comprising:
means for supplying power beforehand to the facsimile unit and for performing facsimile transmission by a single touch including only the depression of a facsimile sending key.

12. A videoconference device according to claim 11, comprising:
means for outputting a 16 Hz call signal to the facsimile unit to inform the facsimile to be called and causing the facsimile unit to automatically answer the call signal using an automatically answering function of the facsimile unit.

13. A videoconference device according to claim 12, comprising:
means for outputting a 1300 Hz single tone signal to the facsimile unit to inform the facsimile to be called and causing the facsimile unit to automatically answer the signal using an automatically answering function (non-ring calling function) of the facsimile unit.

14. A videoconference device according to claim 4, comprising:
means for sending a signal indicative of a FAX request command;
means for sending a signal indicative of a FAX ready command; and
means for establishing a facsimile signal channel on a facsimile transmission after receiving the FAX ready command of a facsimile unit of the other party.

15. A videoconference device according to claim 14, comprising:
means for supplying power beforehand to the facsimile unit and for performing facsimile transmission by a single touch including only the depression of a facsimile sending key.

16. A videoconference device according to claim 15, comprising:
means for outputting a 16 Hz call signal to the facsimile unit to inform the facsimile to be called and causing the facsimile unit to automatically answer the call signal using an automatically answering function of the facsimile unit.

17. A videoconference device according to claim 16, comprising:
means for outputting a 1300 Hz single tone signal to the facsimile unit to inform the facsimile to be called and causing the facsimile unit to automatically answer the signal using an automatically answering function (non-ring calling function) of the facsimile unit.

18. A videoconference device according to claim 14, comprising:
means for outputting a 16 Hz call signal to the facsimile unit to inform the facsimile to be called and causing the facsimile unit to automatically answer the call signal using an automatically answering function of the facsimile unit.

19. A videoconference device according to claim 18, comprising:
means for outputting a 1300 Hz single tone signal to the facsimile unit to inform the facsimile to be called and causing the facsimile unit to automatically answer the signal using an automatically answering function (non-ring calling function) of the facsimile unit.

20. A videoconference device according to claim 4, comprising:
means for outputting a 16 Hz call signal to the facsimile unit to inform the facsimile to be called and causing the facsimile unit to automatically answer the call signal using an automatically answering function of the facsimile unit.

21. A videoconference device according to claim 20, comprising:
means for outputting a 1300 Hz single tone signal to the facsimile unit to inform the facsimile to be called and causing the facsimile unit to automatically answer the signal using an automatically answering function (non-ring calling function) of the facsimile unit.

22. A videoconference device according to claim 2, comprising means for communicating with the facsimile unit connected to a telephone network.

23. A videoconference device according to claim 22, comprising:
means for supplying power beforehand to the facsimile unit and for performing facsimile transmission by a single touch including only the depression of a facsimile sending key.

24. A videoconference device according to claim 23, comprising:
means for outputting a 16 Hz call signal to the facsimile unit to inform the facsimile to be called and causing the facsimile unit to automatically answer the call signal using an automatically answering function of the facsimile unit.

25. A videoconference device according to claim 24, comprising:
means for outputting a 1300 Hz single tone signal to the facsimile unit to inform the facsimile to be called and causing the facsimile unit to automatically answer the signal using an automatically answering function (non-ring calling function) of the facsimile unit.

26. A videoconference device according to claim 22, comprising:
means for outputting a 16 Hz call signal to the facsimile unit to inform the facsimile to be called and causing the facsimile unit to automatically answer the call signal using an automatically answering function of the facsimile unit.

27. A videoconference device according to claim 26, comprising:
means for outputting a 1300 Hz single tone signal to the facsimile unit to inform the facsimile to be called and causing the facsimile unit to automatically answer the signal using an automatically answering function (non-ring calling function) of the facsimile unit.

28. A videoconference device according to claim 2, comprising:
means for sending a signal indicative of a FAX request command;
means for sending a signal indicative of a FAX ready command; and
means for establishing a facsimile signal channel on a facsimile transmission after receiving the FAX ready command of a facsimile unit of the other party.

29. A videoconference device according to claim 28, comprising:
means for supplying power beforehand to the facsimile unit and for performing facsimile transmission by a single touch including only the depression of a facsimile sending key.

30. A videoconference device according to claim 29, comprising:
means for outputting a 16 Hz call signal to the facsimile unit to inform the facsimile to be called and causing the facsimile unit to automatically answer the call signal using an automatically answering function of the facsimile unit.

31. A videoconference device according to claim 30, comprising:
means for outputting a 1300 Hz single tone signal to the facsimile unit to inform the facsimile to be called and causing the facsimile unit to automatically answer the signal using an automatically answering function (non-ring calling function) of the facsimile unit.

32. A videoconference device according to claim 28, comprising:
means for outputting a 16 Hz call signal to the facsimile unit to inform the facsimile to be called and causing the facsimile unit to automatically answer the call signal using an automatically answering function of the facsimile unit.

33. A videoconference device according to claim 32, comprising:
means for outputting a 1300 Hz single tone signal to the facsimile unit to inform the facsimile to be called and causing the facsimile unit to automatically answer the signal using an automatically answering function (non-ring calling function) of the facsimile unit.

34. A videoconference device according to claim 2, comprising:
means for supplying power beforehand to the facsimile unit and for performing facsimile transmission by a single touch including only the depression of a facsimile sending key.

35. A videoconference device according to claim 34, comprising:
means for outputting a 16 Hz call signal to the facsimile unit to inform the facsimile to be called and causing the facsimile unit to automatically answer the call signal using an automatically answering function of the facsimile unit.

36. A videoconference device according to claim 35, comprising:
means for outputting a 1300 Hz single tone signal to the facsimile unit to inform the facsimile to be called and causing the facsimile unit to automatically answer the signal using an automatically answering function (non-ring calling function) of the facsimile unit.

37. A videoconference device according to claim 2, comprising:
means for outputting a 16 Hz call signal to the facsimile unit to inform the facsimile to be called and causing the facsimile unit to automatically answer the call signal using an automatically answering function of the facsimile unit.

38. A videoconference device according to claim 37, comprising:
means for outputting a 1300 Hz single tone signal to the facsimile unit to inform the facsimile to be called and causing the facsimile unit to automatically answer the signal using an automatically answering function (non-ring calling function) of the facsimile unit.

39. A videoconference device according to claim 2, wherein said telephone network simulator comprises:
a telephone connection terminal for connecting to a telephone connection terminal of a facsimile unit;
second switching means for selecting whether two lines from said telephone connection terminal should be short-circuited or opened; and
second current detecting means for detecting the flow of a current on the basis of short-circuiting of the two lines from said telephone connection terminal,
whereby said facsimile control means controls said second switching means and said second current detecting means detects the operative state of the facsimile unit.

40. A videoconference device comprising:
video input means for receiving an image to generate an image signal;
image encode/decode means for encoding/decoding the image signal;
means for outputting a received decoded image signal;
voice input means for receiving voice to generate a voice signal;
voice encode/decode means for encoding/decoding the voice signal;
means for outputting a received decoded voice signal;
a telephone network simulator for interfacing a facsimile unit;
signal converting means for converting a signal from a facsimile unit to a digital signal and converting a digital signal to a signal for the facsimile unit;
facsimile control means for controlling said telephone network simulator;
multiplexing/demultiplexing communication control means for multiplexing voice, image and facsimile communication data and sending the multiplexed data to a communication network and demultiplexing multiplexed data from the communication network into respective voice, image and facsimile communication data;
control data inputting means for inputting data on dial or other function selection; and
videoconference control means connected to said control data inputting means for controlling said image encode/decode means, voice encode/decode means, signal converting means, facsimile control means, and multiplexing/demultiplexing communication control means, wherein said facsimile control means detects an operative state of a facsimile unit on the basis of a control request from said videoconference control means and a signal from said telephone network simulator, controls said telephone network simulator and requests said videoconference control means to send/receive data on the facsimile unit;

wherein said telephone network simulator comprises:

a facsimile connection terminal connected to a line connection terminal of the facsimile unit, call means for outputting a call signal of a general analog telephone set, power supply means for supplying to said facsimile connection terminal a voltage and current which meets the standards of the general analog telephone set, first current detecting means for detecting the flow of a current based on power supply from said power supply means, and first switching means for selecting whether a signal from said facsimile connection terminal should be connected to said call means or to a circuit composed of said power supply and an input/output circuit of said signal converting means, whereby said facsimile control means detects the operative state of the facsimile unit on the basis of a signal from said first current detecting means and controls said first switching means and said supply means.

41. A video conference device according to claim 40, wherein said telephone network simulator is controlled by said facsimile control means, and simulates an external telephone set for the facsimile unit.

42. A videoconference device according to claim 40, wherein said telephone network simulator comprises:

a telephone connection terminal for connecting to a telephone connection terminal of a facsimile unit;

second switching means for selecting whether two lines from said telephone connection terminal should be short-circuited or opened; and second current detecting means for detecting the flow of a current on the basis of short-circuiting of the two lines from said telephone connection terminal, whereby said facsimile control means controls said second switching means and said second current detecting means detects the operative state of the facsimile unit.

* * * * *

UNITED STATES PATENT AND TRADEMARK OFFICE
CERTIFICATE OF CORRECTION

PATENT NO. : 5,373,316
DATED : December 13, 1994
INVENTOR(S) : I. ISHINABE, ET AL.

It is certified that error appears in the above-indentified patent and that said Letters Patent is hereby corrected as shown below:

On the title page, item [75], delete "toshiaki" and insert --Toshiaki--.

Signed and Sealed this

Twenty-fourth Day of October, 1995

*Attest:*

BRUCE LEHMAN

*Attesting Officer*     *Commissioner of Patents and Trademarks*